Patented Apr. 2, 1946

2,397,602

UNITED STATES PATENT OFFICE 2,397,602

PREPARATION OF ESTER POLYMERS

William Franklin Gresham, Wilmington, Del., assignor to E. I. du Pont de Nemours & Company, Wilmington, Del., a corporation of Delaware No Drawing. Application November 22, 1941,
Serial No. 420,099

5 Claims. (Cl. 260—2)

This invention relates to a process for the preparation of oxygenated organic compounds and more particularly to the preparation of polymeric compounds from hydroxy acetal derivatives and organic acid esters as well as the compounds thus prepared.

An object of the present invention is to provide new reaction products from organic acid esters and poly glycol formals or polymeric forms of 1,3-dioxolane which contain a hydroxyl group. An object of the invention is to provide new compositions of matter from hydroxy acetals and organic acid esters, the reaction being accelerated by means of an alcoholysis catalyst. Yet another object is to provide an ester interchange process for the interaction of poly glycol formals or hydroxy-substituted 1,3-dioxolane compounds with mono or polycarboxylic acid esters. Another object is to provide reaction conditions and suitable catalysts therefor whereby valuable products are obtainable. Other objects and advantages of the invention will hereinafter appear.

The objects of the invention are accomplished by reacting, under suitable conditions for interchange of alcohol radicals, a hydroxy-substituted 1,3-dioxolane derivative, polymer thereof, or poly glycol formal with the ester of an organic acid, the alcohol corresponding to the alkyl radical of the ester being different from the hydroxy-substituted 1,3-dioxolane or polymer thereof reacted. This interchange of alcohol radicals is effected by heating the hydroxy-substituted 1,3-dioxolane derivative, polymer thereof, or poly glycol formal and the ester together, preferably in the presence of an alkaline or neutral alcoholysis catalyst. The interchange proceeds with facility if the hydroxy-substituted 1,3-dioxolane derivative, polymer thereof, or poly glycol formal boils at a higher temperature than the alcohol liberated by the interchange, because the latter alcohol may then more readily be removed from the zone of the reaction, for example, by distillation. Valuable products, however, may be obtained as will be described hereinafter without removing the alcohol formed.

The products of the invention are obtained by the ester interchange of hydroxy-substituted 1,3-dioxolane, polymer thereof, or poly glycol formals with the esters of organic acids such, for example, as the esters of:

(1) Monocarboxylic aromatic and aliphatic organic acids,
(2) Polycarboxylic aromatic and aliphatic organic acids,
(3) Mono and polyhydroxy aliphatic and aromatic carboxylic acids,
(4) Substituted carboxylic acids containing at least one carboxyl group, and
(5) Alicyclic acids.

The compounds for reacting with the esters may be obtained in accord with the process of U. S. application S. N. 392,124, which describes the polymerization of 1,3-dioxolane in the presence of an acidic catalyst, these compounds are poly-dioxolanes which may be designated by the formula $(-CH_2OCH_2CH_2O-)_x$ in which $x$ is an integer of at least two and may be as high as 10,000 or more, there being a hydroxyl at either or both ends of the chain; or in accord with U. S. application S. N. 392,125 now Patent No. 2,350,350 which describes the interaction in the presence of an acidic catalyst of formaldehyde with the vicinal glycols and more particularly with ethylene glycol, these compounds are polyglycol formals which may be designated by the formula $HOCH_2CH_2(OCH_2OCH_2CH_2)_nOH$ in which $n$ is a positive integer, specific examples of which are di($\beta$-hydroxyethyl) formal, $HOCH_2CH_2O)_2CH_2$; and di($\beta$-hydroxyethyl) acetal,

$(HOCH_2CH_2O)_2C_2H_4$;

or in accord with the process of U. S. application S. N. 392,126 which describes the reaction of formals with the vicinal glycols in the presence of an acidic catalyst, these compounds are also polyglycol formals having structures similar to those described under S. N. 392,125; or the products obtained in accord with the U. S. application S. N. 392,127 now Patent No. 2,382,938, which describes the polymerization in the presence of an acidic catalyst of the linear formals which contain at least two functional groups which groups may be formal groups or an alcohol group and a formal group, these compounds are also polyglycol formals having structures similar to those described under S. N. 392,125.

The products of the above pending applications which can, in accord with the invention of the instant case, be reacted with esters of carboxylic acids may be illustrated generically by the formula: $HOCH_2CH_2(OCH_2OCH_2CH_2)_nOR$, in which $n$ is an integer and R is a hydrogen; alkyl (such as methyl, ethyl, propyl, and butyl), hydroxyalkylene (such as hydroxyethylene $(-CH_2CH_2OH)$;

and hydroxypropylene, $(-CH_2CH_2CH_2OH)$); alkoxyalkylene (such as methoxyethylene,

$(-CH_2CH_2OCH_3)$, and ethoxyethylene, (—CH$_2$CH$_2$OC$_2$H$_5$)); and hydroxycyclic alkylene (such as cyclohexanol, cyclohexyl cyclohexanol, and dicyclohexyl cyclohexanol). Specific examples of these compounds include di-(β-hydroxyethyl) formal, (HOCH$_2$CH$_2$O)$_2$CH$_2$;

di[β-(hydroxy)methoxy] ethane, (HOCH$_2$CH$_2$OCH$_2$O)$_2$CH$_2$CH$_2$;

di[β-(hydroxyethoxy)methoxyethyl] formal, (HOCH$_2$CH$_2$OCH$_2$OCH$_2$CH$_2$O)$_2$CH$_2$;

hydroxyethylmethoxyethyl formal,

HOCH$_2$CH$_2$O(CH$_3$OCH$_2$CH$_2$O)CH$_2$;

di(β-(hydroxyethyl) acetal, (HOCH$_2$CH$_2$O)$_2$C$_2$H$_4$. and di(β-hydroxybutyl) formal, (CH$_3$CH$_2$CHOHCH$_2$O)$_2$CH$_2$.

The poly glycol formals can be combined in accord with the invention with the lower aliphatic and more particularly the methyl, ethyl, n- and iso-propyl, n- and isobutyl, and amyl esters of: (1) monocarboxylic aliphatic acids, such, for example, as: formic, acetic, propionic, n- and isobutyric, n- and iso-valeric acid, (β-hydroxyethoxy) acetic acid, trimethyl acetic and the higher acids of this class, such as, for example, capric, lauric, myristic, palmitic, stearic, melissic acids, etc.; the hydroxy substituted acids of this class such, for example, as: hydroxyacetic, hydroxypropionic, lactic acids and their dehydration products such as glycolide, glycolic anhydride, diglycolic anhydride, lactid, etc.; the alkoxy substituted acids of the class such, for example, as: methoxy-, ethoxy-, propoxy-, methoxymethoxy-, ethoxymethoxy-acetic, propionic and higher like substituted acids; and the unsaturated acids and their polymers such, for example, as: acrylic, α-substituted acrylic, (e. g., methacrylic), maleic, fumaric, butenic, angelic, tiglic, oleic, ricinoleic, elaidic, erucic acids, and such of these acids that are obtained in polymeric forms, etc.; (2) the monocarboxylic aromatic acids, such, for example, as: benzoic, phenyl-acetic, o-, m-, and p-tolyic, hydrocinnamic, o-, m-, p-tolyl acetic, o-, m-, p-ethyl benzoic and mesitylenic acids; the substituted acids of the class such, for example, as: salicylic, meta and para hydroxy-benzoic, mandelic, tropic, oxy-benzoic, and anisic acids and the unsaturated acids such, for example, as: cinnamic, atropic, phenyl-propiolic, and coumaric acids; (3) the polycarboxylic aliphatic acids such, for example, as: oxalic, malonic, succinic, glutaric, adipic, meso-oxalic, oxal-acetic, acetone dicarboxylic, pimelic, camphoric acids, 1,1-di(carbohydroxy) methane, 1,1-di(carbohydroxy) alkanes, etc.; the hydroxy substituted acids of the class such, for example, as: tartronic, malic, tartaric, racemic and other acids of this class such, for example, as: trihydroxyglutaric, saccharic, mucic, isosaccharic, dihydroxy-tartaric, and diacetosuccinic, tricarbollylic, and citric acids; (4) the polycarboxylic aromatic acids such, for example, as: o!, m-, p-phthalic, hydrophthalic, 2,5-dihydroxy-terephthalic, and mellitic acids; (5) the alicyclic acids such, for example, as cyclopropanoic, and hexahydro-benzoic acids, and such miscellaneous acids as: the ketone acids; pyruvic, phthalonic, levulinic, the acyl substituted acids, hydroxyacetoxy, acetic, propionic, butyric acids and acids such as cyanacetic, sulfanilic, tannic and the sulfur analogues of the carboxylic acids, such as RCOSH, RCSOH, RCSSH in each of which the R group is an alkyl, and polymers of the invention may also be made from the esters and dehydration products of the above acids, such as the anhydrides, polyacids, etc. Saturated and unsaturated fatty acid oils may likewise be reacted with the hydroxy-substituted 1,3-dioxolanes and, by way of example, there are included: cotton seed, rape, sesame, sperm, beechnut, linseed, porpoise jaw, poppy, sun flower, palm nut, coconut, tall, soybean, China-wood, corn, castor, ucuhuba, and oiticica oils, as well as the triglycerides, tripalmitics, tristearics, etc.

In conducting the alcoholysis between lower alkyl esters of the above-designated acids and the poly glycol formals it is usually desirable to remove from the product the lower boiling alcohol formed during the reaction. In many instances, however, and particularly when the alcohol does not interfere with the use to which the product is to be put the alcohol may be left in the product. This is especially true if higher molecular weight alcohol esters are reacted with the hydroxydioxolanes. By way of this alternate procedure useful products are obtained by, for example, alcoholysis of the poly glycol formals with natural glycerides such as glyceryl tripalmitate, glyceryl tristearate, and similar higher alkyl esters of organic acids containing, for example, more than 10 carbon atoms. Glycol, glycerol, and higher aliphatic alcohol esters of the above extended list of acids may be similarly treated if desired but generally not with equally advantageous results. The glycol, glycerol, or other high molecular weight alcohols liberated during the reaction may be retained in the product to aid in improving its plasticity, flexibility, or other properties or the product may be extracted for the removal of the water soluble portion or otherwise treated to remove portions of the product soluble in extracting agents which are non-solvents of the desired product. When the reaction of the invention is conducted with these high molecular weight alcohol esters it is often advantageous to have the esters present in excess.

The reaction of poly glycol formals with the ester may be effected at temperatures ranging between 25 and 300° C. and preferably between 100 and 250° C. Catalysts are preferably used such, for example, as sodium hydroxide, calcium oxide, zinc oxide, litharge, mixtures particularly of lead and zinc oxides, the alkaline alcoholysis catalysts, such as, for example, sodium methoxide, potassium methoxide, sodium ethoxide, sodium glyceroxide, and alkali metal alcoholates generally; the alkaline earth alcoholates; and the alkali metal salts of weak inorganic and organic acids and the alkali metal soaps. Other non-acid alcoholysis catalysts may be used.

The ratio of ester to the poly glycol formal may vary through wide limits but usually it will be found that as is illustrated by the examples, an excess of the ester should be present. This is particularly true if an azeotrope is formed between the alcohol formed as a result of the reaction and the ester or, as stated above, when glycerides are treated with the polyglycol formals.

Examples will now be given illustrating preferred embodiments of the invention, but it will be understood that the invention is not restricted to the details thereof. The parts are by weight unless otherwise indicated and conversions are based on the weight of ester over the theoretical quantity.

*Example 1.*—A reaction mixture comprising 524 parts of di(methoxyethyl) adipate, 272 parts of di-(β-hydroxyethyl) formal, 3.5 parts litharge and 3.5 parts of zinc oxide was heated at 125–150° C. under 52 mm. pressure. Methoxyethanol, produced by the alcohol exchange, distilled at 55° C. and 153.5 parts were collected. The polyester product was treated with 18 parts of water and carbon dioxide to precipitate the catalyst as carbonates. Subsequent to treating the mixture with decolorizing carbon, filtering and stripping off water and 15 parts of unconverted di-(β-hydroxyethyl) formal, 600 parts of a colorless viscous liquid was obtained. The polyester dissolved cellulose nitrate and chlorinated rubber and had these physical and chemical constant: Hydroxyl No. 137.0; saponification No. 493.6; refractive index $N_{25}^D$ 1.4555; and density at 25° C., 1.1397.

Example 2.—Under processing conditions simulating those described in example 1, 123 parts of isobutyl alcohol, produced by alcohol exchange, was removed from a mixture consisting of 276 parts of isobutyl (carboisobutoxymethoxymethoxy) acetate, [(CH₃)₂CHCH₂OOCCH₂O]₂CH₂, 390 parts of di-(β-hydroxyethyl) formal, 6 parts of litharge and 3 parts of zinc oxide. The product obtained, after separation of 88.5 parts of unconverted di-(β-hydroxyethyl) formal, amounted to 395.3 parts of a colorless somewhat viscous liquid which dissolved nitrocellulose. The physical and chemical constants of this compound were: Hydroxyl No. 313.5; saponification No. 252.7; density at 25° C., 1.205; and refractive index, $N_{25}^D$ 1.4598.

Example 3.—A mixture consisting of 10 parts of monomeric methyl methacrylate, 52.5 parts of a poly glycol formal (hydroxyl No. 51.6) and 1 part of 28% sodium methoxide in methanol was heated at 80–100 mm. and 100–190° C. for 5 hours and then at 1 mm. to remove all unreacted methyl methacrylate. To the practically colorless, viscous liquid product, 55.3 parts, was added 0.2 part of benzoyl peroxide. On heating at steam bath temperature, the material polymerized to a practically colorless solid.

Example 4.—To 14 parts of di-(β(hydroxyethoxy) methoxyethyl) formal,

CH₂(OCH₂CH₂OCH₂OCH₂CH₂OH)₂ and 10.6 parts of methyl laurate was added 1 part of 28% sodium methoxide in methanol. The resulting mixture was heated at 90° C. and 2 mm. for 2 hours. Methanol formed by the exchange was removed fairly rapidly. Subsequent to treatment of the product dissolved in benzene with carbon dioxide, filtration of the mixture and removal of benzene under reduced pressure, 21.5 parts of a solid laurate ester was obtained. This material was substantially insoluble in water.

Example 5.—Under conditions similar to those described in Example 4 ester interchange was effected between 105 parts of di-(β-hydroxyethoxymethoxy) ethane,

HOCH₂CH₂OCH₂OCH₂CH₂OCH₂OCH₂CH₂OH and 106.5 parts of methyl laurate employing 5 parts of 28% sodium methoxide dissolved in methanol as catalyst. The laurate ester obtained, 182.5 parts, was a solid which was practically insoluble in water.

Example 6.—Similar to Example 4 with the exception that processing was carried out at 100–120° C., 230 parts of a solid stearate ester melting at 41–42° C. which was not completely soluble in water was obtained from 54.2 parts of methyl stearate and 200 parts of poly glycol formal (molecular weight, 1030). Extraction of the ester with hot cyclohexane gave 203 parts of a solid which melted at 45–46° C. This portion was completely miscible with water. Aqueous solutions exhibited excellent foaming properties. The water soluble fraction gave on analysis: hydroxyl No. 6.3; ester No. 28; and molecular weight 1410.

Example 7.—A mixture comprising 86 parts of ethyl fumarate, 70 parts of di-(β-hydroxyethyl) formal, 0.1 part litharge and 0.05 part zinc oxide was processed at 110–120° C. and 100–2 mm. pressure for 6 hours. During this time 39 parts of ethanol was collected. The mobile liquid product, 114 parts, was dissolved in benzene, filtered to remove catalyst and the benzene stripped off under reduced pressure. This gave a very light yellow mobile liquid. A 2 g. sample of benzene containing 0.5 g. benzoyl peroxide was added to 20 g. of the polyester. The mixture, when heated on the steam bath, polymerized to a glass-like polymer.

Example 8.—A sample of 128 parts of coconut oil was added to 222 parts of poly glycol formal (molecular weight, 353) containing 3 parts of litharge and 1.5 parts of zinc oxide. The mixture was heated for 15 hours at 145° C. with stirring. Subsequent to removal of catalyst by filtration, the product was extracted with n-hexane. The n-hexane insoluble fraction, 202.5 parts, was a viscous light brown liquid which when added to water gave an excellent foam. The n-hexane soluble fraction amounted to 103 parts.

Example 9.—A water soluble, n-hexane insoluble, liquid laurate ester, 140 parts, was prepared similarly to the ester from coconut oil acids (Example 8) from 176 parts of poly glycol formal (molecular weight, 353), 107 parts of methyl laurate, 1.8 parts of litharge and 0.9 part of zinc oxide using 50 parts of xylene as solvent. Agitation of clear aqueous solution produced considerable foam. The n-hexane soluble portion amounted to 96.7 parts.

Example 10.—A solid laurate ester, M. P. 44–47° C., which was soluble in water was prepared from 207 parts of ethylene poly glycol formal (hydroxyl No. 58), 42.8 parts of methyl laurate and 1 part of sodium methoxide by processing at 200° C. with good stirring for 4 hours. Unconverted methyl laurate, 23.5 parts, was removed by extraction of the product with n-hexane. The water soluble solid laurate ester amounted to 155 parts. Aqueous solution exhibited foaming properties.

Example 11.—A di-(β-hydroxyethyl) formal adipate poly ester was obtained by heating 524 parts, approximately 2 moles, of dimethoxyethyl adipate, 272 parts, approximately 2 moles, of di-(β-hydroxyethyl) formal, 7 parts of lead oxide, and 3.5 parts of zinc oxide to a temperature of approximately 200° C. 153.5 parts of methoxy ethanol were removed at 52 mm. and 55° C. 18 parts of water were added and carbon dioxide bubbled through the mixture for about two hours. The poly ester was then treated with a clarifying charcoal and filtered.

The esters and polymers of the invention are non-polar, surface-acting agents and are generally applicable for use where agents of this nature are required.

In cotton and linen processing the products of the invention are particularly useful for wetting of raw stock to reduce fly in carding; in wetting out of skeins, packages, beams, warps, and chain warps; as wetting agent for dyeing with inorganic salts as iron and chromium salts; and as agents to increase the absorbency of towels, face cloths, mops, and cleaning cloths generally. In the cotton and linen processing they are likewise applicable for use as assistants in, oiling of raw stock, kier boiling, and bleaching; as penetrants in mercerizing caustic solutions; as assistants in shrink setting finishing; as aids in dyeing; and as dispersing agents for vat and sulfur dyes.

In wool processing these compounds are particularly adapted for raw wool scouring; as ingredients of fulling soap to aid rinsing and of mineral oil to improve removal from fabric; as assistants in carbonizing, to improve neutralization after carbonizing, in acid fulling, in Vigoreaux printing, in dyeing with wool colors, in felting, and in dyeing of hat felts; and they may likewise be used in the finishing of wool to give soft hand.

The esters of the application are likewise suitable for use in rayon processing and may be used as assistants to aid in improving penetration in regenerated cellulose process rayon manufacture; as assitants for desulfurizing rayon; as agents to prevent crater formation in spinnerets, use in nylon and regenerated cellulose process spinning; as penetrants for rayon size; as assistants for creping and finishing woven and knit goods, and for use in dyeing with all types of colors.

In the cellulose acetate, regenerated cellulose, silk, nylon and the artificial filament and fabric processing the products of the invention may be employed as assistants in soaking of raw fibers, in degumming of silk, in tin weighting and silicating of silk, and in removal of oil and graphite stains as well as kaumagraph marks. They likewise may be used in the conditioning of silk, dyeing of silk and polyamides, and in the rewetting of splash-proof hose prior to boarding.

In the processing of other fibers they are likewise useful in scouring and dyeing of jute, straw, and hair; as penetrants of straw hats for bleaching; as aids in feather washing; as penetrants of "Cellophane" wrapped straws; and as dispersing agents for resins in moth-proofing compounds.

In the manufacture of leather the esters may likewise be used as assistants in solvent degreasing of skins, in the bating process, in leveling and dyeing as penetrants, in fat liquoring of leather, in alum or in chrome and alum treatments of white leather; as wetting agents in the glazing of skins for recoloring and for the treatment of back dried skins and crusted leather; in the cleaning of leather prior to tanning; and as agents for solubilizing and dispersing vegetable tanning materials. In the fur industry, the products may be used as assistants in dyeing with intermediates; and as oxidizing agents, in alum tannage of skins, and in degreasing of skins with solvents.

In the petroleum industry, the products of the invention may be used as penetrants in acid treatment of oil wells; as assistants in flooding waters for recovery of petroleum from oil bearing sands; and as assistants in breaking crude oil-brine emulsions.

For use in the paper industry, the esters may be employed as assistants in cooking rags; better sizing with clay and alum, calender sizing and coloring, making transparent or glassine paper, and preparing fireproof paper. They may be used in washing of paper and board mill felts; in neutral, alkaline, and acid washing baths in treating mill felts; as agents in the de-inking of paper stock; and to increase absorbency of paper towels, blotting papers, facial tissue, and the like; and as a pitch dispersing agent for beaters.

In the metal industry the esters may be used as wetting agents for acid and alkaline cleaning with or without solvent emulsions, and especially for use prior to enameling and lacquering; as wetting agents in lime baths to quench the pickle. They may be used as assistants to remove drawing grease from small metal parts, in wire drawing, in electrolytic pickling baths especially to give a foam blanket therein; as addition agents to lime for drawing steel bars; as ingredients in buffing compounds, sodium silicate flux for welding rods, and soldering fluxes generally; as addition agents in electroplating baths, such as, nickel, tin, copper, gold, silver, zinc and cadmium; as anti-pitting agents for bright nickel and bright copper plating; and as emulsifying agents for coating aluminum with wax.

In the paint industry, the esters are applicable for use as ingredients in casein cold water paints, lacquer emulsions, such as nitrocellulose emulsions, caustic paint stripping baths, and lacquers to prevent blocking off of paper; as wetting agents for wet sanding automobile body finishes; and as assistants in metallized surface coating, especially of paper.

In the laundry and dry cleaning industry and for such uses generally the water-soluble esters are particularly applicable for use as wetting agents and detergents and may be used in washing compositions for use on automobiles, busses, railroad cars, and the like, and as wetting agents generally. They may also be used for acid cleaning of bricks; as foaming agents for household hypochlorite bleach; as cleaning agents for spun glass air filters; and as addition agents to soaps to give dispersion of the insoluble salts present or to prevent their formation. The products may likewise be used as ingredients in radiator cleaners, denture cleaners, shoe cleaners, dry cleaning soaps, dish washing compounds, household alkali cleaners, househould ammonia, glass cleaners, spot removers, laundry blueing, sterilizing compounds for dish washing, paint cleaner, acid porcelain cleaners, and milk bottle cleaners for mechanical washers.

The products likewise have utility in agricultural uses and particularly as wetting agents in insecticidal and fungicidal sprays; as ingredients of acid or alkaline fruit washing compositions, especially for removing spray residues; and as emulsifying agents in all types of sprays.

In the cosmetic industry the surface acting, non-polar products of the invention may be employed as emulsifying agents in lotions and creams and as ingredients in brushless shaving cream, depilatory cream, hair wave lotion, foaming bath salts and water softeners, hair dye preparations, shampoos, bubble bath preparation, and in dentifrices of the liquid, paste or powder form.

The esters of the invention may be used as wetting, dispersing, spreading, and emulsifying agents in the ceramic industry, for injection moulding mixes and in the preparation and use of paint, pigments, and pastes in printing, painting, etc., as assistants for pigment grinding with bentonite; as ingredients of cement to improve grinding and setting; as assistants in the preparation of slips of refractories; and as foaming agents to increase bulk in manufacture of mineral wool insulation, bricks, wall boards, and thermal insulation of cements. As dispersing and spreading agents they are especially useful in the preparation and use of dyes.

In the rubber industry the products of the instant case may be used as penetrants in acid processes for the reclaiming of rubber; as mould lubricants for rubber articles; as agents to prevent adhesion of milled rubber; as foaming agents in the manufacture of sponge rubber articles; and in latex compounding for: wetting of insoluble fillers, as channel black, clay, whiting, and blanc fixe; as an assistant in the incorporation of immiscible liquids in emulsion form; stabilization of latex emulsions against mechanical or chemical action; as plasticizers and softeners for rubber and elastomers generally and improving impregnation characteristics of rubber latex for use in the preparation of fabrics for coatings and the like.

The esters may be used generally as wetting agents for use in pigments, dry colors, embalming fluids, with calcium chloride for laying mine dust, in air-conditioning systems, photographic developer baths, in inks, in preventing fogging of safety glass, in wall paper removers, in household dye preparations, and as wetting agents for dry powdered foods such as baby foods and cocoa; in printing compositions for linoleum and in tobacco leaves, especially for use in cigar wrapper leaf. The polymeric esters may likewise be employed as ingredients of printing ink for offset printing, in fly paper and fly killers, and in lacquer printing compositions. The esters may likewise be employed as assistants in settling inorganic slimes; for the control of crystal growth and formation of aggregates; for control of thixotropy in paints; for preservation of green fodder; as spreading agents in adhesives; as assistants in the preparation of lake colors; and for stripping dyestuffs from fibers; as assistants in rug shampoo; and as assistants in, regenerating zeolite systems for soft milk, etching solutions for photo-engravers, and application to surfaces to give adherence to poured concrete. The products of the invention may likewise be used as dispersing assistants for pigments and printing inks; as foaming agents in air-foam type fire extinguishers; as penetrants in the manufacture of asphalt roofing paper; as ingredients in wood stains, and in creosoting liquors for use in preserving wood; and as emulsifying agents they are suitable for use in the dispersion and extension of oils and waxes; as polishers; as emulsifying agents in salad dressings, as flotation agents in ore treatment; as assistants in drilling muds to control thixotropy and settling properties; as a dispersing or sequestering agent for iron, chromium and aluminum salts in leather processing, as leather softeners for cellulose nitrate, cellulose acetate, cellulose aceto butyrate, polymeric methyl methacrylate, polymeric methylacrylate and other polymeric esters and interpolymers of acrylic and substituted acrylic acids, polyvinyl acetate, polyvinyl chloride and synthetic resins generally.

I claim:

1. A process which comprises heating to a temperature between 25 and 300° C., under alcoholysis conditions and in the presence of a non-acid alcoholysis catalyst an organic carboxylic acid ester and a compound selected from the group consisting of di-(beta-hydroxyethyl) formal, di(beta-(hydroxyethoxy) methoxy) ethane, di(beta-(hydroxyethoxy) methoxyethyl) formal, hydroxyethyl methoxyethyl formal, di(beta-(hydroxyethyl) acetal, di(beta-hydroxybutyl) formal, and polymeric products resulting from heating 1,3-dioxolane in contact with an acidic catalyst.

2. A process which comprises heating to a temperature between 25 and 300° C. and in the presence of a non-acid alcoholysis catalyst an organic carboxylic acid ester and a polymeric product resulting from heating 1,3-dioxolane in contact with an acidic catalyst.

3. A process which comprises reacting at a temperature between 25 and 300° C. and in the presence of a non-acid alcoholysis catalyst coconut oil and a compound selected from the group consisting of di-(beta-hydroxyethyl) formal, di(beta-(hydroxyethoxy)methoxy) ethane, di-(beta-(hydroxyethoxy) methoxyethyl) formal, hydroxyethylmethoxyethyl formal, di(beta-(hydroxyethyl) acetal, and di(beta-hydroxybutyl) formal, and polymeric products resulting from heating 1,3-dioxolane in contact with an acidic catalyst.

4. A process which comprises reacting at a temperature between 25 and 300° C. and in the presence of a non-acid alcoholysis catalyst an adipic acid ester and a compound selected from the group consisting of di-(beta-hydroxyethyl) formal, di(beta-(hydroxyethoxy) methoxy) ethane, di(beta-(hydroxyethoxy)methoxyethyl) formal, hydroxyethylmethoxyethyl formal, di(beta-(hydroxyethyl) acetal, di(beta-hydroxybutyl) formal, and polymeric products resulting from heating 1,3-dioxolane in contact with an acidic catalyst.

5. A process which comprises reacting at a temperature between 25 and 300° C. and in the presence of a non-acid alcoholysis catalyst a lauric acid ester and a compound selected from the group consisting of di-(beta-hydroxyethyl) formal, di(beta-(hydroxyethoxy) methoxy) ethane, di(beta-(hydroxyethoxy)methoxyethyl) formal, hydroxyethylmethoxyethyl formal, di(beta-(hydroxyethyl) acetal, di(beta-hydroxybutyl) formal, and polymeric products resulting from heating 1,3-dioxolane in contact with an acidic catalyst.

WILLIAM FRANKLIN GRESHAM.